April 30, 1957   J. W. WILSON ET AL   2,790,280
SPINDLE POSITIONING MECHANISM
Filed March 21, 1955   4 Sheets-Sheet 3

INVENTORS
JOHN W. WILSON
BY ROBERT L. HENRY
N. N. Parsons & L. W. Wright
ATTORNEYS.

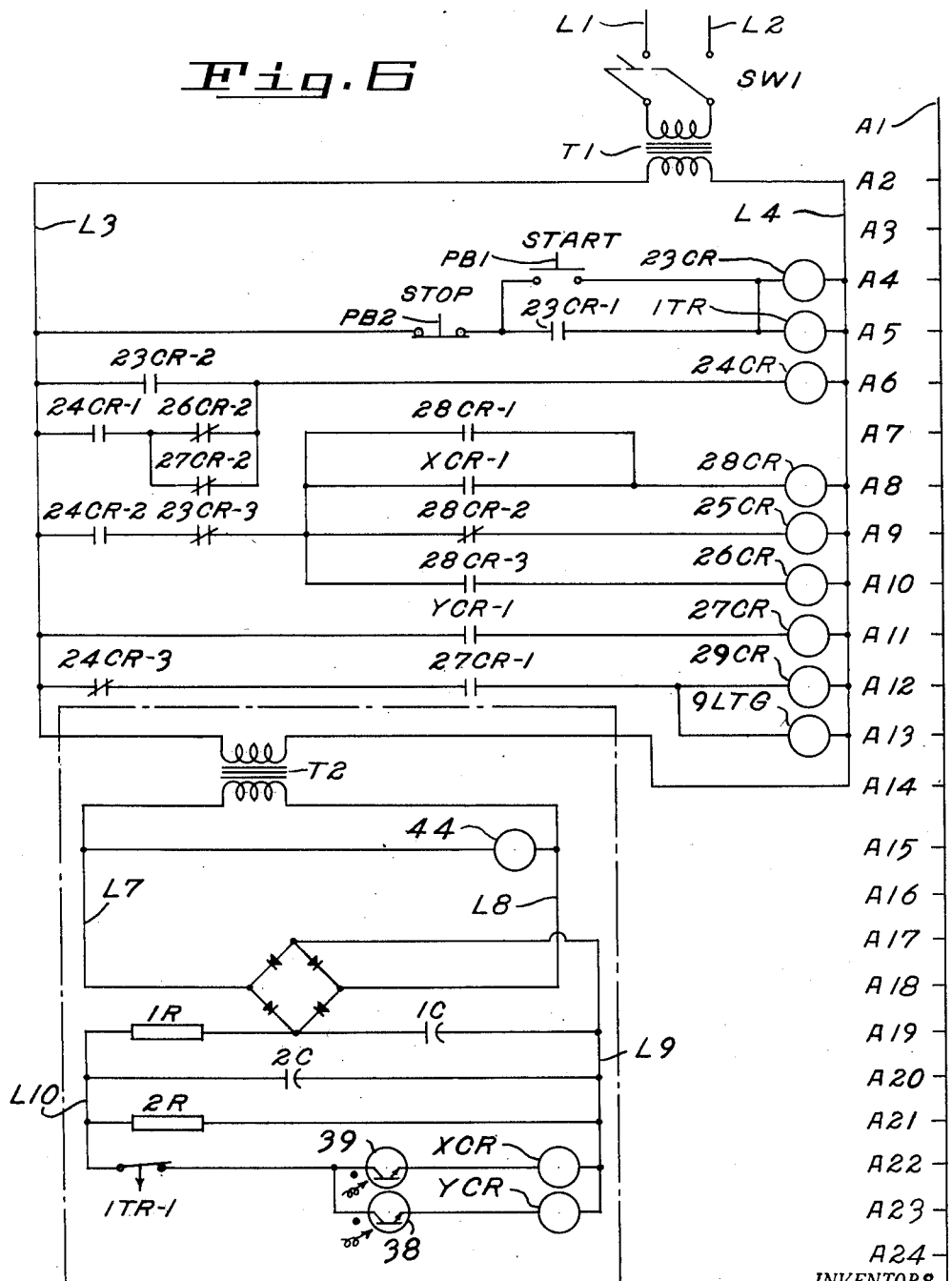

United States Patent Office 2,790,280
Patented Apr. 30, 1957

2,790,280

SPINDLE POSITIONING MECHANISM

John W. Wilson and Robert L. Henry, Cincinnati, Ohio, assignors to The Cincinnati Milling Machine Co., Cincinnati, Ohio, a corporation of Ohio Application March 21, 1955, Serial No. 495,556

8 Claims. (Cl. 51—237)

This invention relates to machine tools such as grinding machines and more particularly to a new and improved apparatus for accurately controlling the stopping of a work spindle.

The application of "automation" to machine tools has greatly increased their productivity, but one of the problems that has been encountered in the design of such machines is that of precisely stopping the work driver in a predetermined angular position upon completion of a machining operation for work loading and unloading purposes.

Therefore, one of the objects of this invention is to provide a simplified, highly accurate, and trouble-free control for stopping a work spindle in a predetermined position.

Another object of this invention is to provide a new and improved electrical control mechanism for accurately stopping a rotating machine tool spindle in the same predetermined angular position each time it is stopped.

Still another object of this invention is to provide a new and improved positioning control mechanism for stopping a prime mover in a predetermined rotary position and which is the sole driving means for a spindle.

A further object of this invention is to provide a new and improved spindle positioning control mechanism in which the highly desirable characteristics of a photosensitive semiconductor device, such as germanium or the like, are utilized to transmit a signal from the rotating spindle to the said control mechanism to determine accurately and precisely the angular position of stopping the spindle.

Another object of this invention is to provide a new and improved spindle positioning control mechanism in which there is no actual physical contact between the spindle and the control mechanism for stopping the spindle in the same predetermined angular position each time it is stopped.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Throughout the several views of the drawings, similar reference characters are employed to denote the same or similar parts.

Figure 5 is an enlarged diagrammatic view of the plate associated with the signal transmitting mechanism as viewed along the line 5—5 shown in Figure 3.

Figure 6 is an elementary wiring diagram of the control circuit for the spindle control mechanism, shown in a deenergized condition.

Figure 1:
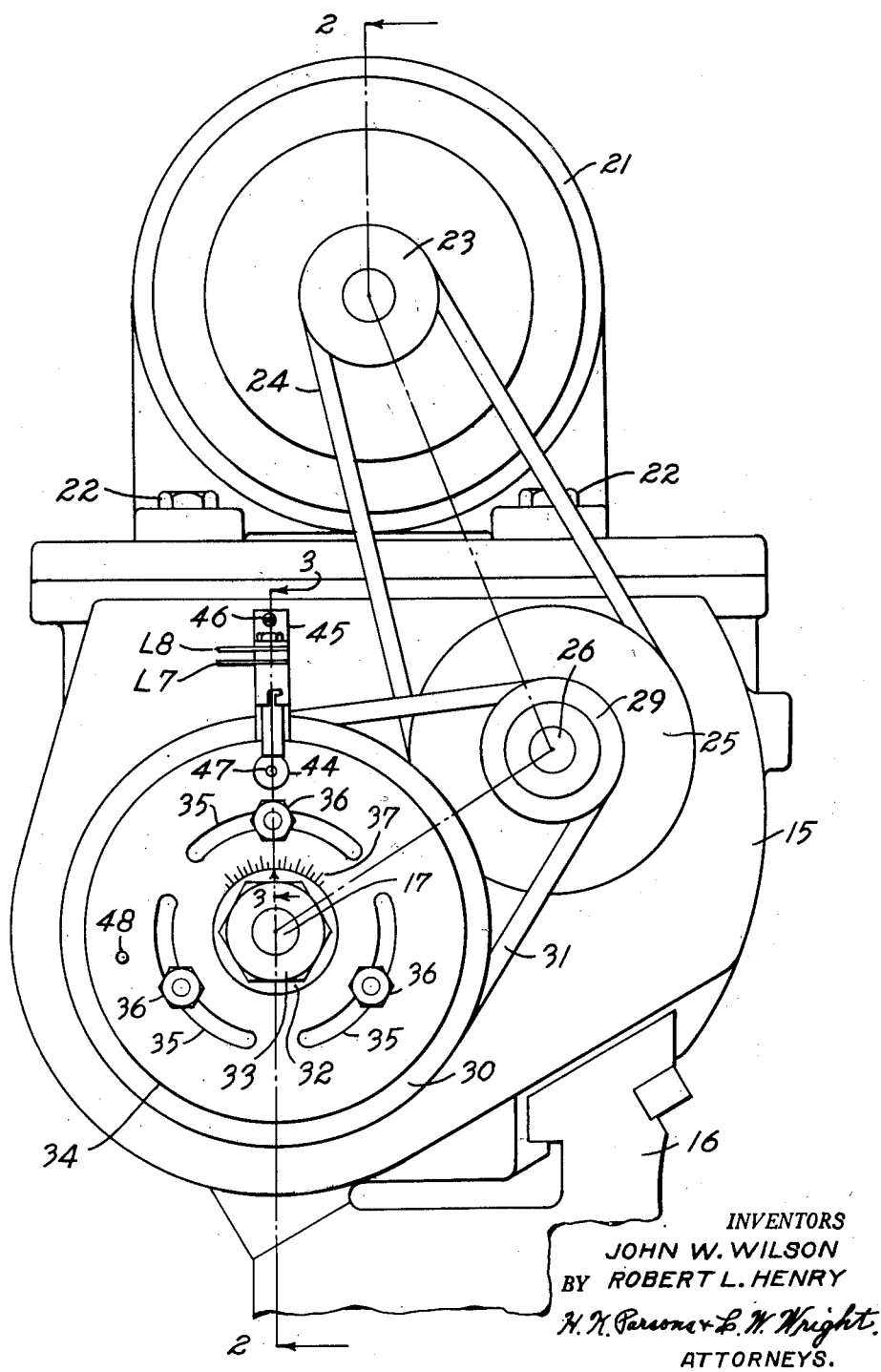
Figure 1 is an end view of a typical machine tool spindle headstock incorporating the features of this invention.
Figure 2:
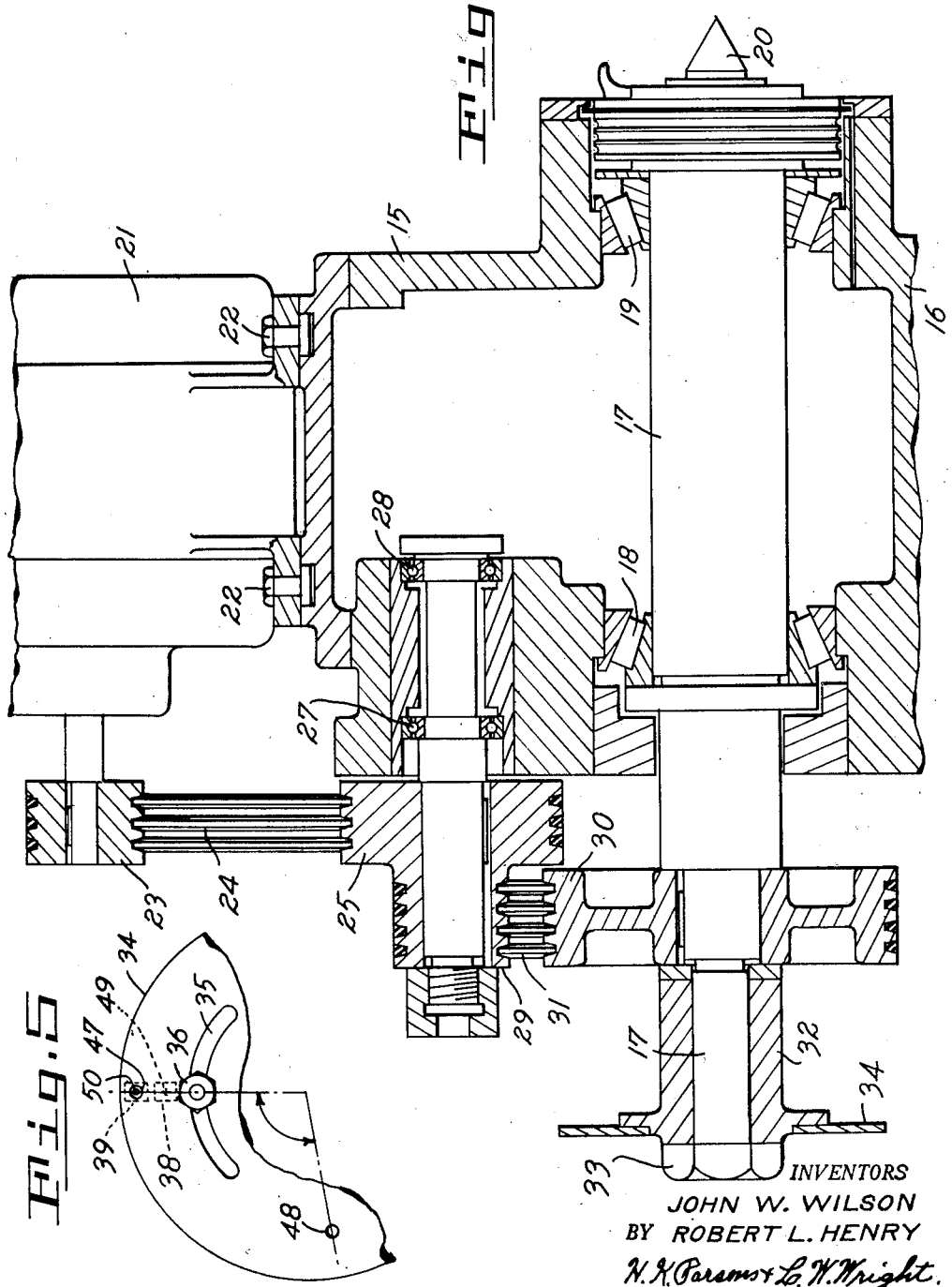
Figure 2 is a diagrammatic sectional view through the headstock and drive for the work spindle as viewed along the line 2—2 of Figure 1.

As heretofore stated, the application of "Industrial Automation" is playing an increasingly important role in the machine tool industry.

An example of effective automation is in the problem of loading piston castings into a completely automatic elliptical grinding machine in which the pistons are ground to an ellipse due to the synchronized relationship between the rotation of the grinding wheel and the rotating headstock.

Normally, without the application of automation, the operator takes a casting from the stack and places it in the chucking mechanism and manually rotates the piston until a small reference point which is cast on the piston head is aligned with a similar point on the headstock of the machine irrespective of the angular position at which the headstock has been stopped after completion of the preceding machining cycle of operation, all of which is a time consuming operation.

But with the application of automatic loading such that the work is automatically presented to the machine in the same angular position each time, stopping the headstock in the same precise predetermined angular position after each preceding machining cycle of operation is completed is now of great concern, in order for the reference point carried by the piston and the reference point carried by the headstock to automatically be aligned accurately and precisely to begin the next work cycle.

Prior attempts along this line have been made utilizing locating pins as the positive stopping means. These attempts proved unsuccessful due to excessive wear between the pin and hole which contributed undesirable error to the accuracy of the locating device.

Therefore, a new and improved headstock positioning control mechanism has been devised in which there is no actual physical contact between the said control mechanism and the headstock, thus eliminating the aforementioned undesirable characteristics and to provide a simplified, highly accurate, and troublefree control for stopping the headstock.

The new and improved mechanism consists essentially of a photoelectric detecting and triggering means and means for applying deceleration and dynamic braking to an electric prime mover which is operatively connected to the headstock as the sole source of driving power thereof.

The photoelectric detecting and triggering means consists essentially of a pair of photosensitive semiconductors, such as transistors or the like, a rotatable disc operatively connected to the headstock and having two small openings or holes formed therein, a source of light whose incident rays are normal to the transistor "sensitive spot," a pair of relays; one for each transistor, and a source of low D. C. voltage.

It is to be understood that a vacuum phototube could successfully be used in the aforementioned mechanism, but it has been found that a photo sensitive semiconductor, such as photo transistors or the like, have highly desirable characteristics in that they are very small, extremely rugged, are highly sensitive for instantaneous triggering operation, and also possess a very small sensitive spot area which is in the order of less than one sq. mm. Therefore, it can be seen that as the transistor sensitive spot is extremely small, the size of the said holes or opening to be formed in the disc may also be quite small, that is to say, in the order of one mm. diameter, and thus the "triggering angle" or the deviation of trigger from normal, may be kept to practically zero, thus enhancing the triggering accuracy as the transistors will only be energized when the hole in the disc is directly over the sensitive spot.

When the photo transistor and relay are connected in series to the D. C. power source, each time incident light falls on the sensitive spot of the transistor, rated current will flow therein and thus the relay will be energized. When the said incident light is restricted from the transistor, only a small amount of current will flow therein due to the ambient light falling thereon, which will be in the order of a few microamps and known in the art as "dark current." But the dark current is not enough to keep the relay energized, and thus the said relay will immediately drop out. Therefore, the photo transistor can in a sense be considered a variable resistor whose magnitude of current flow is dependent upon the amount of impinging light falling thereon.

It was found that it was necessary to provide two triggering signals for control purposes due to the driving inertia of the prime mover during the stopping of the headstock. After the prime mover is brought to a slow speed from its normal fast cutting speed by conventional methods, the first signal is used to initiate the change from the slow speed to a creep speed and the second signal initiates the precision-stop dynamic braking for the prime mover to bring the said prime mover to a sudden stop accurately and precisely. Therefore, two transistors and two sensitive relays are thereby provided.

In order to provide separate incident light signals from a single source for the two said transistors, which are mounted side by side, a rotatable disc is operatively connected to the headstock having two small holes or openings formed therein at different radii so as to admit the incident rays of illumination to the individual transistors in a sequential order. The first opening is so aligned as to provide one light signal which passes only to one transistor for initiating the change from slow speed to creep speed for the headstock, whereas the second opening provides the second light signal which falls on the second transistor and triggers the dynamic braking means which applies dynamic braking to the prime mover and immediately stops the headstock in the same precise predetermined angular position each time upon completion of the machining cycle of operation.

For illustrative purposes, this invention is shown applied to a machine tool headstock comprising a housing 15 mounted on a machine frame 16 and having journaled therein the work spindle 17 on suitable bearings 18 and 19. The work spindle 17 is usually provided with a spindle nose portion 20 to which may be attached the work holder or driver, comprising a driving face plate, chuck, or work fixture which is to be rotated in the presence of a cutting element, not shown, fed to it by the feeding mechanism of the machine.

In this improved spindle control mechanism there is provided a prime mover or motor 21 fixed to the headstock 15 by suitable bolts 22 and which is connected to drive the work spindle 17 through the motor pulley 23, the belts 24, and the idler pulley 25 fixed to an idler shaft 26 journaled in suitable bearings 27 and 28 mounted in the headstock housing 15. Formed integral with the idler pulley 25 is idler pulley 29 which drives the pulley 30 fixed to the spindle 17 through appropriate belts 31.

A sleeve member 32 is pressed onto the spindle 17 against the pulley 30 and locked thereto by a nut 33. A disc 34 having elongated slots 35 is pressed onto the sleeve member 32 and locked thereto in an adjustable position by bolts 36 threaded therein. The disc 34 may be adjusted to any angular position relative to the spindle 17 as determined by the graduated scale 37 and then locked in said adjusted position by bolts 36.

Figure 3:
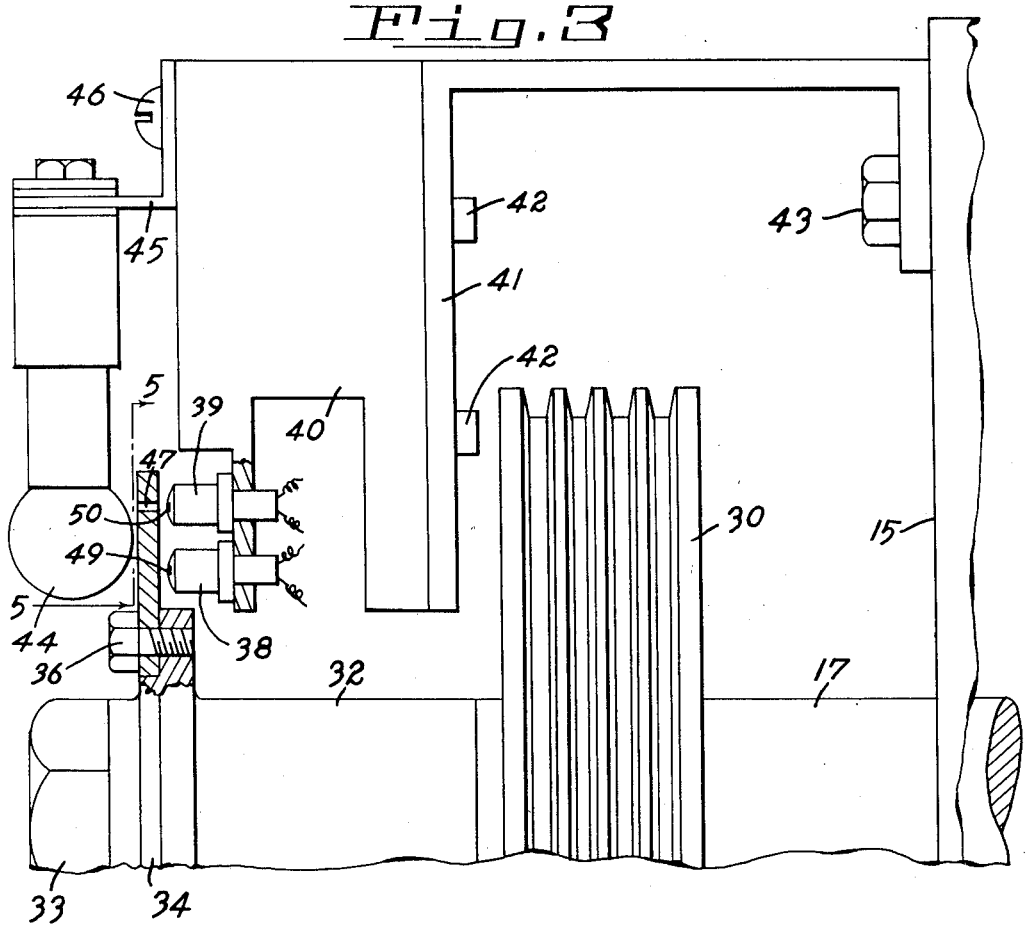
Figure 3 is a diagrammatic view of the signal transmitting mechanism associated with the work spindle along the line 3—3 of Figure 1.

With reference to Figure 3, two photo-sensitive elements 38 and 39, preferably photo-sensitive semiconductors such as photo transistors or the like, are mounted on a support member 40 adjacent the disc 34 in any conventional manner. The said support member 40 is secured to a bracket 41 by bolts 42 which bracket is mounted on the headstock housing 15 by a bolt or bolts 43. A source of light 44 is provided and mounted on the opposite side of the disc 34 from the transistors 38 and 39 by means of a bracket 45 which is mounted on the support member 40 by bolt 46.

With reference to Figure 5, two small holes or openings 47 and 48, one of which, 47, may be elongated in the circumferential direction to provide sufficient time for its associated relay to respond to the signal produced by the phototransistor. The holes have a diameter or width in the order of one mm. more or less and are formed in the disc 34 at such a radial distance from the axis of spindle 17 and at such an arcuate spacing with respect to one another that as the disc 34 is rotated, the said holes 47 and 48 will sequentially align with and expose the sensitive spots 50 and 49 of transistors 39 and 38 respectively to the light source 44, shown in Figure 3, thereby providing two separate light signals, which cause sequential energization of the said respective transistors thereby.

Figure 4:
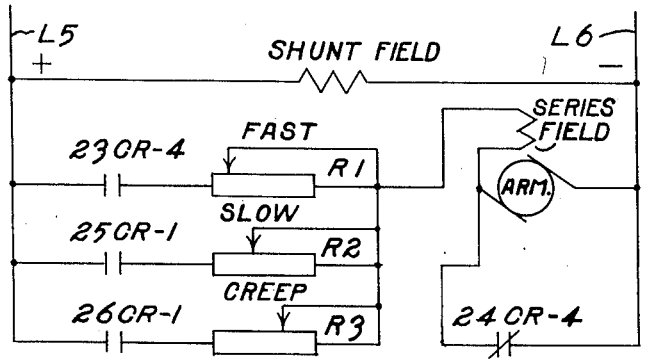
Figure 4 is an elementary wiring diagram of the electric power circuit for the prime mover, shown in a deenergized condition.

The operation of this spindle control and positioning mechanism may best be understood by tracing a typical operating cycle of the machine as shown in Figures 4 and 6.

For the sake of convenience of description and to enhance the ease of compression of the electrical circuitry, as shown in Figure 6, it will be noted that a vertical scale A1 has been provided on the right edge of the drawing in such a manner so as to provide horizontal consecutively numbered reference lines from A2 to A24. Each electrical component of the control circuit hereinafter mentioned will be located on one of said reference lines and will be so referred.

When the main power line SW1 is thrown, the transformer T1 is energized from the main power lines L1 and L2, thereby energizing the feed lines L3 and L4. Therefore, as the start push button PB1 on line A4 is actuated, the relay coils 23CR and 1TR will be energized.

When the coil 23CR is energized, contacts 23CR–1 on line A5 will close to latch the circuit around the start pushbutton PB1; contacts 23CR–2 on line A6 will close and the coil 24CR will be energized; contacts 23CR–3 on line A9 open; and contacts 23CR–4 in Figure 4 close to insert the fast speed control resistor R1 in series with the motor armature and the D. C. feed lines L5 and L6, thereby causing the armature to rotate at a desired fast or running speed, depending upon the setting of the resistor R1.

As the time relay coil 1TR is energized, contacts 1TR–1 on line A22 open immediately to prevent the transistors 38 and 39 from being energized but will be timed-closed at a desired time as will later be seen. As the coil 24CR is energized, contacts 24CR–1 on line A7 close to maintain the coil 24CR energized; contacts 24CR–2 on line A9 close; contacts 24CR–3 on line A12 open; and contacts 24CR–4 in Figure 4 open.

Now as the stop pushbutton PB2 on line A5 is actuated after the grinding operation is completed, coils 23CR and 1TR are deenergized. As the coil 23CR is deenergized, contacts 23CR–1 on line A5 open; contacts 23CR–2 on line A6 open, but the coil 24CR remains energized; contacts 23CR–3 on line A9 close to energize the coil 25CR; and contacts 23CR–4 in Figure 4 open to remove the resistor R1 from the speed control circuit so that a second resistor can be substituted. As the time relay coil 1TR on line A5 is deenergized, contacts 1TR–1 on line A22 do not close immediately but will be timed-closed to time the deceleration between fast speed of the headstock and the time at which the headstock position sensing relays XCR and YCR are to be effective. This time, of course, may be different for various machines to which the invention could be effectively applied.

As the coil 25CR on line A9 is energized, contacts 25CR–1 in Figure 4 close to insert the slow speed control resistor R2 in series with the armature and therefore the armature will be slowed down to a rate depending upon the setting of the variable resistor R2. As the motor 21 slows down, contacts 1TR–1 on line A22 close and when the hole 47 passes the sensitive spot 50 of transistor 39, light rays from the source 44 will fall thereon and thus rated current will flow therein and the relay coil XCR will be energized thereby.

As the coil XCR is energized, contacts XCR–1 on line A8 close to energize the relay 28CR. As the coil 28CR is energized, contacts 28CR–1 on line A7 close to maintain the relay coil 28CR energized; contacts 28CR–2 on line A9 open to deenergize the relay coil 25CR; and contacts 28CR–3 on line A10 close to energize the relay coil 26CR.

As the relay coil 25CR is deenergized, contacts 25CR–1 in Figure 4 open to remove the slow speed resistor R2 from the armature control circuit, so that a third resistor may be substituted therein. As the relay coil 26CR is energized, contacts 26CR–1 in Figure 4 close to insert the variable creep speed control resistance R3 in series with the armature and therefore the headstock will be rotated at a very slow or creep speed; and contacts 26CR–2 on line A7 open, but the coil 24CR remains energized.

As the hole 48 passes the sensitive spot 49 of the transistor 38, light rays from the light source 44 will fall thereon and rated current will therefore flow in the transistor 38, and the relay coil YCR on line A23 will be energized thereby. As the coil YCR is energized, contacts YCR–1 on line A11 close to energize the relay coil 27CR. As the coil 27CR is energized, contacts 27CR–1 on line A12 close, and contacts 27CR–2 on line A8 open to deenergize the relay coil 24CR.

As the relay coil 24CR is deenergized, contacts 24CR–1 on line A7 open; contacts 24CR–2 on line A9 open to deenergize the relay coils 28CR and 26CR; contacts 24CR–4 in Figure 4 close which provides a short circuit across the armature which causes dynamic braking therein, and the headstock will be brought to an immediate stopped position; and contacts 24CR–3 on line A12 close, thereby illuminating the green indicating light 9LTG, thus indicating that the spindle has stopped in the correct position and also energizing the relay coil 29CR to start the automatic loading in any conventional manner.

As the relay coil 28CR on line A8 is deenergized, contacts 28CR–1 on line A7 open; contacts 28CR–2 on line A9 close; and contacts 28CR–3 on line A10 open. As the relay coil 26CR is deenergized, contacts 26CR–1, in Figure 4, open to remove the speed control resistor R3 from the armature circuit.

Therefore, the above circuit has now been restored to its original starting condition ready for the next cycle to be actuated.

There has thus been provided an improved control and positioning mechanism for machine tool spindles which is highly efficient and accurate in operation.

What is claimed is:

1. In a machine tool having a spindle, a driving motor, and a driving connection therebetween, the combination of an electrical power circuit for said motor containing a first deceleration means operative to decelerate said motor from a normal fast speed to a slow speed, a second deceleration means operative to decelerate said motor from said slow speed to a creep speed, and dynamic braking means operative to stop said motor, an electrical control circuit for said power circuit including a first switch for initiating operation of said first deceleration means after completion of a grinding operation, a first and a second photosensitive means radially spaced with respect to the axis of said spindle, a second switch actuable by said first switch after completion of said first deceleration to render said photosensitive means effective, a source of light energy, a disc mounted on said spindle and interposed between said light source and said photosensitive means, said disc having a first and a second circumferentially spaced small hole formed therein in line with said first and second photosensitive means respectively for admitting incident light through said first hole to cause said first photosensitive means to initiate operation of said second deceleration means and during the continued revolution of said disc to admit incident light through said second hole to cause said second photosensitive means to initiate operation of said dynamic braking means to stop said motor in a predetermined angular position with the said second hole in line with said second photosensitive means and within the limits of the diameter of said hole.

2. In a machine tool having a spindle, a driving motor and a driving connection therebetween, the combination of an electrical power circuit for said motor containing a first deceleration means operative to decelerate said motor from a normal fast speed to a slow speed, a second deceleration means operative to decelerate said motor from said slow speed to a creep speed, and dynamic braking means operative to stop said motor, an electrical control circuit for said power circuit including a first switch for initiating operation of said first deceleration means after completion of a grinding operation, a first and a second photo-sensitive semi-conductor means radially spaced with respect to the axis of said spindle, a second switch actuable by said first switch after completion of said deceleration to render said photo-sensitive semi-conductor means effective, a source of light energy, a disc mounted on said spindle and interposed between said light source and said semi-conductor means, said disc having a first and a second circumferentially spaced small hole formed therein in line with said first and second semi-conductor means respectively for admitting incident light through said first hole to cause said first semi-conductor means to initiate operation of said second deceleration means and during the continued revolution of said disc to admit incident light through said second hole to cause said second semi-conductor means to initiate operation of said dynamic braking means to stop said motor in a predetermined angular position with the said second hole in line with said second semi-conductor means and within the limits of the diameter of said hole.

3. In a machine tool having a spindle, a driving motor, and a driving connection therebetween, the combination of electrical means operative to decelerate said motor from a normal fast speed to a creep speed, a first switch for initiating operation of said deceleration means after completion of a grinding operation, a second switch parallel connected across the armature of said motor operative to stop said motor by dynamic braking upon closure thereof, a photosensitive element for initiating closure of said second switch, a third switch connected in series with said photosensitive element and rendered actuable by said first switch to render said photosensitive element effective to initiate closure of said second switch after completion of said deceleration, a source of light energy, a disc mounted on said spindle between said light source and said photosensitive element, said disc having a small hole formed therein in line with said photosensitive element for admitting incident light therethrough to said photosensitive element to initiate closure of said second switch to stop said motor in a predetermined angular position with said hole in line with said photosensitive element within the limits of the diameter of said hole.

4. In a machine tool having a spindle, a driving motor, and a driving connection therebetween, the combination of means operative to decelerate said motor from a normal fast speed to a creep speed, a first switch operative for initiating operation of said deceleration means after completion of a grinding operation, dynamic braking means for said motor operative to stop rotation thereof, a photosensitive element for initiating operation of said dynamic braking means, a second switch connected in series with said photosensitive element and rendered actuable by said first switch to render said photosensitive element effective after completion of said deceleration, a source of light energy, a disc mounted on said spindle between said light source and said photosensitive element, said disc having a small hole formed therein in line with said photosensitive element for admitting incident light therethrough to said photosensitive element to initiate operation of said dynamic braking means to stop said motor in a predetermined angular position with said hole in line with said photosensitive element within the limits of the diameter of said hole.

5. In a machine tool having a spindle, a driving motor, and a driving connection therebetween, the combination of electrical means operative to decelerate said motor from a normal fast speed to a creep speed, a time delay relay, a first switch for initiating operation of said deceleration means and said time delay relay after completion of a grinding operation, a second switch connected in parallel across the armature of said motor and operative upon closure thereof to stop said motor by dynamic braking, a photosensitive element for initiating closure of said second switch, a pair of delay contacts on said time delay relay connected in series with said photosensitive element for rendering said element effective to initiate closure of said second switch after completion of said deceleration, a source of light energy, a disc mounted on said spindle between said light source and said photosensitive element, said disc having a small hole formed therein in line with said photosensitive element for admitting incident light therethrough to said photosensitive element to initiate closure of said second switch to stop said motor in a predetermined angular position with said hole in line with said photosensitive element within the limits of the diameter of said hole.

6. In a machine tool having a spindle, a driving motor and a driving connection therebetween, the combination of means operative to decelerate said motor from a normal fast speed to a creep speed, a time delay relay, a switch operative to initiate operation of said deceleration means and said time delay relay after completion of a grinding operation, dynamic braking means for said motor operative to stop rotation thereof, a photosensitive element for initiating operation of said dynamic braking means, a pair of delay contacts on said time delay relay connected in series with said photosensitive element for rendering said element effective to initiate operation of said dynamic braking means after completion of said deceleration, a source of light energy, a disc mounted on said spindle between said light source and said photosensitive element, said disc having a small hole formed therein in line with said photosensitive element for admitting incident light therethrough to said photosensitive element to initiate operation of said dynamic braking means to stop said motor in a predetermined angular position with said hole in line with said photosensitive element within the limits of the diameter of said hole.

7. In a machine tool having a spindle, a driving motor, and a driving connection therebetween, the combination of electrical means operative to decelerate said motor from a normal fast speed to a creep speed, a first switch for initiating operation of said deceleration means after completion of a grinding operation, a second switch connected in parallel across the armature of said motor and operative to stop said motor by dynamic braking upon closure thereof, a relay for initiating closure of said second switch, a phototransistor connected in series with said relay for controlling the operation thereof, a third switch connected in series with said relay and phototransistor and rendered effective by said first switch to close the circuit through said relay and phototransistor after completion of said deceleration, a source of light energy, a disc mounted on said spindle between said light source and said phototransistor, said disc having a small hole formed therein in line with said phototransistor for admitting incident light therethrough to said phototransistor to initiate closure of said second switch to stop said motor in a predetermined angular position with said hole in line with said phototransistor within the limits of the diameter of said hole.

8. In a machine tool having a spindle, a driving motor, and a driving connection therebetween, the combination of means operative to decelerate said motor from a normal fast speed to a creep speed, a first switch operative for initiating operation of said deceleration means after completion of a grinding operation, dynamic braking means for said motor operative to stop rotation thereof, a relay for initiating operation of said dynamic braking means, a phototransistor connected in series with said relay for controlling operation thereof, a second switch connected in series with said relay and phototransistor and rendered effective by said first switch to close the circuit through said relay and phototransistor after completion of said deceleration, a source of light energy, a disc mounted on said spindle between said light source and said phototransistor, said disc having a small hole formed therein in line with said phototransistor for admitting incident light therethrough to said phototransistor to initiate operation of said dynamic braking means to stop said motor in a predetermined angular position with said hole in line with said phototransistor within the limits of the diameter of said hole.

References Cited in the file of this patent
UNITED STATES PATENTS

| | | |
|---|---|---|
| 2,441,291 | Rivora | May 11, 1948 |
| 2,753,502 | Kylin | July 3, 1956 |